(12) United States Patent
Motomura et al.

(10) Patent No.: US 8,129,298 B2
(45) Date of Patent: Mar. 6, 2012

(54) NONWOVEN LAMINATES AND PROCESS FOR PRODUCING THE SAME

(75) Inventors: Shigeyuki Motomura, Chiba (JP); Kenichi Suzuki, Ichihara (JP); Naosuke Kunimoto, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 738 days.

(21) Appl. No.: 11/616,677

(22) Filed: Dec. 27, 2006

(65) Prior Publication Data

US 2008/0038982 A1   Feb. 14, 2008

Related U.S. Application Data

(60) Provisional application No. 60/809,499, filed on May 31, 2006.

(51) Int. Cl.
*B32B 5/26* (2006.01)
*D04H 1/00* (2006.01)
*D04H 1/56* (2006.01)

(52) U.S. Cl. ........ 442/382; 442/328; 442/329; 442/381; 442/400

(58) Field of Classification Search .................. 442/328, 442/329, 381, 382, 400
See application file for complete search history.

(56) References Cited

U.S. PATENT DOCUMENTS

| | | | |
|---|---|---|---|
| 5,470,639 A | 11/1995 | Gessner et al. | |
| 5,607,798 A * | 3/1997 | Kobylivker et al. | 442/381 |
| 5,997,989 A | 12/1999 | Gessner et al. | |
| 6,936,554 B1 * | 8/2005 | Singer et al. | 442/327 |
| 2006/0052023 A1 * | 3/2006 | Lauridsen et al. | 442/389 |
| 2006/0121812 A1 | 6/2006 | Suzuki et al. | |
| 2006/0141883 A1 | 6/2006 | Nishiguchi et al. | |

FOREIGN PATENT DOCUMENTS

| | | |
|---|---|---|
| EP | 0989222 | 3/2000 |
| EP | 1589140 | 10/2005 |
| JP | 62-133107 | 6/1987 |
| JP | 07-503502 | 4/1995 |
| JP | 08-510798 | 11/1996 |
| JP | 2002-242069 | 8/2002 |
| JP | 2004-003096 | 1/2004 |
| JP | 2004-197291 | 7/2004 |
| JP | 2004-244791 | 9/2004 |
| WO | 92/16366 | 10/1992 |
| WO | 9315251 | 8/1993 |
| WO | 9428224 | 12/1994 |
| WO | 99/49120 | 9/1999 |
| WO | WO 2004/038078 A2 * | 5/2004 |

OTHER PUBLICATIONS

Extended European Search Report Dated Oct. 4, 2011.

* cited by examiner

*Primary Examiner* — Norca L Torres Velazquez
(74) *Attorney, Agent, or Firm* — Rankin, Hill and Clark LLP

(57) ABSTRACT

A nonwoven fabric laminate possesses excellent elasticity, softness, water resistance, fuzz resistance and curl resistance, and has less stickiness.

The nonwoven fabric laminate includes at least one meltblown nonwoven fabric layer and mixed-fiber spunbonded nonwoven fabric layers on both surfaces of the at least one meltblown nonwoven fabric layer, the mixed-fiber spunbonded nonwoven fabric layers each comprising mixed fibers including 10 to 90 wt % of continuous fibers of a thermoplastic elastomer (A) and 90 to 10 wt % of continuous fibers of a thermoplastic resin (B) other than the thermoplastic elastomer (A) ((A)+(B)=100 wt %).

6 Claims, No Drawings

NONWOVEN LAMINATES AND PROCESS FOR PRODUCING THE SAME

FIELD OF THE INVENTION

The present invention relates to nonwoven fabric laminates having excellent elasticity, softness, water resistance, fuzz resistance and curl resistance and having less stickiness, and to a process for the production thereof.

BACKGROUND OF THE INVENTION

Nonwoven fabrics are breathable and soft, and have wide applications in recent years. Various properties are required depending on the applications, and are required for further improvements.

The nonwoven fabrics used as sanitary materials in disposable diapers and sanitary napkins and as base cloths of poultices require high water resistance and moisture permeability. Elasticity and bulkiness are required depending on where the nonwoven fabrics are applied.

Elastic nonwoven fabrics may be produced by spunbonding thermoplastic elastomers (e.g., Patent Document 1), or by using mixed fibers including thermoplastic polyurethane fibers and thermoplastic polymer fibers (e.g., Patent Document 2). Although apart from elasticity, nonwoven fabrics of continuous fibers including sticky fibers of hydrogenated styrene block copolymers and nonsticky fibers are proposed (e.g., Patent Document 3).

To achieve improved water resistance, spunbonded nonwoven fabrics and meltblown nonwoven fabrics are laminated (e.g., Patent Documents 4 and 5).

However, none has achieved sufficient elasticity, softness and processability, and improvements in these properties are desired.

[Patent Document 1] JP-A-H07-503502
[Patent Document 2] JP-A-2004-244791
[Patent Document 3] JP-A-2004-197291
[Patent Document 4] JP-A-H08-510798
[Patent Document 5] JP-A-2004-3096

DISCLOSURE OF THE INVENTION

It is therefore an object of the present invention to provide a nonwoven fabric laminate which has excellent elasticity, softness, water resistance, fuzz resistance and curl resistance and has less stickiness.

A nonwoven fabric laminate according to the present invention comprises at least one meltblown nonwoven fabric layer and mixed-fiber spunbonded nonwoven fabric layers on both surfaces of the at least one meltblown nonwoven fabric layer, the mixed-fiber spunbonded nonwoven fabric layers each comprising mixed fibers including 10 to 90 wt % of continuous fibers of a thermoplastic elastomer (A) and 90 to 10 wt % of continuous fibers of a thermoplastic resin (B) other than the thermoplastic elastomer (A) ((A)+(B)=100 wt %).

The continuous fibers of the thermoplastic resin (B) are preferably capable of producing a spunbonded nonwoven fabric having a maximum elongation of not less than 50%.

The thermoplastic elastomer (A) is preferably a thermoplastic polyurethane elastomer.

The thermoplastic polyurethane elastomer preferably has a solidifying point of not less than 65° C. as measured by a differential scanning calorimeter (DSC) and contains not more than 3,000,000 polar solvent-insoluble particles per g as counted on a particle size distribution analyzer, which is based on an electrical sensing zone method equipped with an aperture tube having an orifice of 100 μm in diameter.

The thermoplastic polyurethane elastomer preferably satisfies the following formula (I):

$$a/(a+b) \leq 0.8 \quad (I)$$

wherein "a" is the total heat of fusion obtained from DSC endothermic peaks within the temperature range of from 90 to 140° C. and "b" is the total heat of fusion obtained from DSC endothermic peaks within the temperature range of from above 140 to 220° C.

The thermoplastic resin (B) is preferably a polyolefin.

The thermoplastic resin (B) is preferably a propylene polymer.

The thermoplastic resin (B) preferably comprises 99 to 80 wt % of a propylene polymer and 1 to 20 wt % of a high-density polyethylene.

At least one meltblown nonwoven fabric layer preferably comprises a polyolefin.

At least one meltblown nonwoven fabric layer preferably comprises a propylene polymer.

At least one meltblown nonwoven fabric layer preferably comprises a thermoplastic elastomer.

At least one meltblown nonwoven fabric layer preferably comprises a thermoplastic polyurethane elastomer.

The mixed-fiber spunbonded nonwoven fabric layers preferably each have a basis weight of not more than 40 g/m².

The meltblown nonwoven fabric layer preferably has a basis weight of not more than 40 g/m².

The nonwoven fabric laminate may include an inelastic nonwoven fabric bonded thereto.

The nonwoven fabric laminate may include a breathable film bonded thereto.

A process for producing a nonwoven fabric laminate according to the present invention comprises:

laminating spunbonded nonwoven fabric layers on both surfaces of at least one meltblown nonwoven fabric layer, the mixed-fiber spunbonded nonwoven fabric layers each comprising mixed fibers including 10 to 90 wt % of continuous fibers of a thermoplastic elastomer (A) and 90 to 10 wt % of continuous fibers of a thermoplastic resin (B) other than the thermoplastic elastomer (A) ((A)+(B)=100 wt %); and stretching the laminate.

The process preferably further includes embossing the laminate prior to the stretching.

The nonwoven fabric laminate of the invention has excellent elasticity, softness, fuzz resistance and curl resistance and has less stickiness.

PREFERRED EMBODIMENTS OF THE INVENTION

<Thermoplastic Elastomer (A)>

The thermoplastic elastomer (A) is a component of the mixed-fiber spunbonded nonwoven fabrics for the laminate of the invention. Known thermoplastic elastomers may be used singly or in combination of two or more kinds. Specific examples include styrene elastomers such as block copolymers having at least one aromatic polyvinyl compound block (e.g., polystyrene) and at least one poly(conjugated diene) compound block (e.g., polybutadiene or polyisoprene), and hydrogenated products thereof, with typical examples including polystyrene/polybutadiene/polystyrene block copolymer (SBS), polystyrene/polyisoprene/polystyrene block copolymer (SIS), polystyrene/polyethylene butylene/polystyrene block copolymer (SEBS) and polystyrene/polyethylene propylene/polystyrene block copolymer (SEPS); polyester elastomers such as block copolymers of highly crystalline aromatic polyesters and amorphous aliphatic polyethers; polyamide elastomers such as block copolymers of crystalline high-melting polyamides and amorphous low-glass transition temperature (Tg) polyethers or polyesters; thermoplastic polyurethane elastomers such as block copolymers of a polyurethane hard segment and a polycarbonate polyol, ether polyol, caprolactone polyester or adipate polyester soft segment; polyolefin elastomers such as amorphous or low crystalline ethylene/α-olefin random copolymers, propylene/α-olefin random copolymers, propylene/ethylene/α-olefin random copolymers, and mixtures of these amorphous or low crystalline random copolymers with crystalline polyolefins (e.g., propylene homopolymer, copolymers of propylene and small amounts of α-olefins, high-density polyethylenes and medium-density polyethylenes); vinyl chloride elastomers; and fluoroelastomers.

The styrene elastomers include diblock and triblock copolymers based on a polystyrene block and either a butadiene rubber block or an isoprene rubber block. These rubber blocks may be unsaturated or fully hydrogenated. Specific examples of the styrene elastomers include those commercially available under the trade names of KRATON polymers (Shell Chemicals), SEPTON (KURARAY CO., LTD.), TUFTEC (Asahi Kasei Corporation) and LEOSTOMER (RIKEN TECHNOS CORP.).

Specific examples of the polyester elastomers include HYTREL (E.I. DuPont) and PELPRENE (TOYOBO CO., LTD.).

Specific examples of the amide elastomers include PEBAX (ATOFINA Japan Co., Ltd.).

The polyolefin elastomers include ethylene/α-olefin copolymers and propylene/α-olefin copolymers. Specific examples thereof include TAFMER (Mitsui Chemicals, Inc.), Engage (ethylene/octene copolymer, DuPont Dow Elastomers), CATALLOY (including crystalline olefin copolymers, MONTELL) and Vistamaxx (EXXON MOBILE CHEMICAL COMPANY).

Specific examples of the vinyl chloride elastomers include LEONYL (RIKEN TECHNOS CORP.) and POSMERE (Shin-Etsu Polymer Co., Ltd.)

Of the thermoplastic elastomers, the thermoplastic polyurethane elastomers are preferable in terms of elasticity and processability.

<Thermoplastic Polyurethane Elastomers>

The thermoplastic polyurethane elastomer preferably has a solidifying point of 65° C. or above, more preferably 75° C. or above, most preferably 85° C. or above. The upper limit of the solidifying point is preferably 195° C. The solidifying point used herein is determined with a differential scanning calorimeter (DSC) as follows. The thermoplastic polyurethane elastomer is heated to 230° C. at a rate of 10° C./min, held at 230° C. for 5 minutes, and cooled at a rate of 10° C./min. When an exothermic peak attributed to the solidification of the elastomer appears, the temperature is obtained as the solidifying point. When the thermoplastic elastomer has a solidifying point of 65° C. or above, the mixed-fiber spunbonded nonwoven fabric may be produced without defects such as fused fibers, broken fibers and resin masses. Moreover, the obtainable mixed-fiber spunbonded nonwoven fabric will not adhere to hot embossing rolls and will show so low stickiness that it can be suitably used directly on the skin as garments, sanitary materials, sports materials and the like. When the solidifying point is not more than 195° C., good formability and processability are ensured. The solidifying point of the fibers produced tends to be higher than that of the material thermoplastic polyurethane elastomer used.

In order that the thermoplastic polyurethane elastomer has a solidifying point of not less than 65° C., the materials thereof: a polyol, an isocyanate compound and a chain extender, should have optimum chemical structures, and the amount of the hard segments should be controlled. The amount (wt %) of the hard segments is determined by dividing the total weight of the isocyanate compound and the chain extender by the total weight of the polyol, the isocyanate compound and the chain extender, and multiplying the quotient by 100. The amount of the hard segments is preferably 20 to 60 wt %, more preferably 22 to 50 wt %, most preferably 25 to 48 wt %.

The thermoplastic polyurethane elastomer preferably contains, per g of the elastomer, not more than 3,000,000, more preferably not more than 2,500,000, still more preferably not more than 2,000,000 particles that are insoluble in a polar solvent. The polar solvent insolubles are mainly agglomerates such as fish eyes and gels that are generated during the production of the thermoplastic polyurethane elastomer. The insolubles originate from the materials of the thermoplastic polyurethane elastomer and from the reaction of these materials. Examples of such insolubles include matters originating from agglomerated hard segments, and hard segments and/or soft segments crosslinked together through allophanate linkages or biuret linkages.

The polar solvent-insoluble particles are insolubles occurring when the thermoplastic polyurethane elastomer is dissolved in dimethylacetamide (hereinafter "DMAC") as a solvent. They are counted on a particle size distribution analyzer, which is based on an electrical sensing zone method equipped with an aperture tube having an orifice of 100 μm in diameter. The 100 μm apertures allow passage of particles which are 2 to 60 μm in terms of uncrosslinked polystyrene, and those particles are counted.

When the polar solvent-insoluble particles are not more than 3,000,000 in number per g of the thermoplastic polyurethane elastomer, the fibers will have a narrower diameter distribution and will be more resistant to breakage during the spinning blow the solidifying point of the elastomer. To prevent the strands from containing bubbles and fibers from being broken during the production of the nonwoven fabric with a large spunbonding machine, the water content in the thermoplastic polyurethane elastomer is preferably not more than 350 ppm, more preferably not more than 300 ppm, most preferably not more than 150 ppm.

In terms of elasticity, the thermoplastic polyurethane elastomer preferably satisfies the following formula (I):

$$a/(a+b) \leq 0.8 \quad \text{(I)};$$

more preferably the following formula (II):

$$a/(a+b) \leq 0.7 \quad \text{(II); and}$$

most preferably the following formula (III):

$$a/(a+b) \leq 0.55 \quad \text{(III)};$$

wherein "a" is the total heat of fusion obtained from endothermic peaks within the temperature range of from 90 to 140° C. and "b" is the total heat of fusion obtained from endothermic peaks within the temperature range of from above 140 to 220° C., as determined with a differential scanning calorimeter (DSC).

In the above formula, "a/(a+b)" represents a percentage (%) of the heat of fusion attributed to the hard domains in the thermoplastic polyurethane elastomer. When the percentage is not more than 80%, the thermoplastic polyurethane elastomer fibers, particularly those fibers in the mixed-fiber spunbonded nonwoven fabrics, and the nonwoven fabrics have improved strength and elasticity. In the invention, the lower limit of the percentage of the heat of fusion attributed to the hard domains in the thermoplastic polyurethane elastomer is suitably about 0.1%.

The thermoplastic polyurethane elastomer preferably ranges in melt viscosity from 100 to 3000 Pa·s, more preferably from 200 to 2000 Pa·s, most preferably from 1000 to 1500 Pa·s as measured at 200° C. and 100 sec$^{-1}$ shear rate. The melt viscosity used herein is a value determined on a Capirograph (Toyo Seiki K.K., nozzle length: 30 mm, nozzle diameter: 1 mm).

The thermoplastic polyurethane elastomer having the above properties may be produced as described in JP-A-2004-244791.

The thermoplastic polyurethane elastomer gives a comfortable touch to the obtainable mixed-fiber spunbonded nonwoven fabric and the mixed-fiber spunbonded nonwoven fabric is suitably used as sanitary materials. Moreover, the thermoplastic polyurethane elastomer reduces the probability of clogged filter that is fitted in an extruder for removing impurities, leading to an industrial advantage of infrequent adjustment and maintenance of the apparatus.

The thermoplastic polyurethane elastomer in which the polar solvent-insoluble particles are small in number may be obtained by polymerizing a polyol, an isocyanate compound and a chain extender followed by filtering, as will be described later.

<Polyolefin Elastomers>

Of the polyolefin elastomers, those that are amorphous or low crystalline with an X-ray diffraction crystallinity of not more than 20% (including 0%) are preferred. Preferred examples include copolymers of ethylene and one or more C3-20 α-olefins such as propylene, 1-butene, 1-pentene, 1-hexene, 4-methyl-1-pentene, 1-heptene, 1-octene and 1-decene; and copolymers of propylene and one or more C2-20 α-olefins (excluding the C3 α-olefin) such as ethylene, 1-butene, 1-pentene, 1-hexene, 4-methyl-1-pentene, 1-heptene, 1-octene and 1-decene.

Specific examples of the amorphous or low crystalline ethylene/α-olefin copolymers include ethylene/propylene random copolymer and ethylene/1-butene random copolymer. The melt flow rate (MFR) of the ethylene/α-olefin copolymers is not particularly limited as long as the copolymers are spinnable. The MFR (ASTM D1238, 190° C., 2160 g load) MFR (ASTM D1238, 230° C., 2160 g load) is usually in the range of 1 to 1000 g/10 min, preferably 5 to 500 g/10 min, more preferably 10 to 100 g/10 min.

Specific examples of the amorphous or low crystalline propylene/α-olefin copolymers include propylene/ethylene random copolymer, propylene/ethylene/1-butene random copolymer and propylene/1-butene random copolymer. The MFR of the propylene/α-olefin copolymers is not particularly limited as long as the copolymers are spinnable. The MFR (ASTM D1238, 230° C., 2160 g load) is usually in the range of 1 to 1000 g/10 min, preferably 5 to 500 g/10 min, more preferably 10 to 100 g/10 min.

The polyolefin elastomer may be a composition of the amorphous or low crystalline copolymer and about 1 to 40 wt % of a crystalline polyolefin such as a propylene homopolymer, a copolymer of propylene and a small amount of an α-olefin, a high-density polyethylene or a medium-density polyethylene.

Preferably, the polyolefin elastomer composition may be a polypropylene resin composition that contains 1 to 40 wt % of an isotactic polypropylene (i) and 60 to 99 wt % of a propylene/ethylene/α-olefin copolymer (ii) (wherein propylene accounts for 45 to 89 mol %, ethylene accounts for 10 to 25 mol %, and the α-olefin has 4 to 20 carbon atoms and accounts for less than 30 mol %).

<Thermoplastic Resin (B)>

The thermoplastic resin (B) is a component of the mixed-fiber spunbonded nonwoven fabrics for the laminate of the invention. Known thermoplastic resins other than the thermoplastic elastomers (A) may be used. The thermoplastic resins (B) other than the thermoplastic elastomers (A) will be simply referred to as the thermoplastic resins (B). The thermoplastic resins (B) are resin polymers different from the thermoplastic elastomers (A). The thermoplastic resins (B) are generally crystalline polymers having a melting point (Tm) of not less than 100° C., or amorphous polymers having a glass transition temperature of not less than 100° C. Of the thermoplastic resins (B), the crystalline thermoplastic resins are preferred.

In particular, the thermoplastic resin (B) is preferably such that a spunbonded nonwoven fabric produced therefrom by a known method has a maximum elongation of at least 50%, preferably at least 70%, more preferably at least 100% and shows substantially no elastic recovery. When such extensible but inelastic thermoplastic resin and the thermoplastic elastomer (A) are spunbonded together into a mixed-fiber spunbonded nonwoven fabric, stretching the mixed-fiber spunbonded nonwoven fabric provides a high bulkiness and a comfortable touch. For the same reason, stretching the laminate of the mixed-fiber spunbonded nonwoven fabrics and one or more meltblown nonwoven fabrics provides the same properties, and the mixed-fiber spunbonded nonwoven fabrics prevent the nonwoven fabric laminate from being excessively expanded. The maximum elongation of the spunbonded nonwoven fabric of the thermoplastic resin (B) is not particularly limited but is usually not more than 300%.

Examples of the thermoplastic resins (B) include homopolymers and copolymers of α-olefins (e.g., ethylene, propylene, 1-butene, 1-hexene, 4-methyl-1-pentene and 1-octene), such as high-pressure low-density polyethylene, linear low-density polyethylene (LLDPE), high-density polyethylene (HDPE), polypropylene (propylene homopolymer), polypropylene random copolymers, poly(1-butene), poly(4-methyl-1-pentene), ethylene/propylene random copolymer, ethylene/1-butene random copolymer and propylene/1-butene random copolymer; polyesters such as polyethylene terephthalate, polybutylene terephthalate and polyethylene naphthalate; polyamides such as nylon-6, nylon-66 and polymethaxyleneadipamide; polyvinyl chloride, polyimides, ethylene/vinyl acetate copolymer, ethylene/vinyl acetate/vinyl alcohol copolymers, ethylene/(meth)acrylic acid copolymer, ethylene/acrylate/carbon monoxide copolymer, polyacrylonitriles, polycarbonates, polystyrenes, ionomers and mixtures thereof. Of these, high-pressure low-density polyethylene, linear low-density polyethylene (LLDPE), high-density polyethylene, propylene polymers (such as polypropylene and polypropylene random copolymers), polyethylene terephthalate and polyamides are preferable.

Of the thermoplastic resins (B), the polyolefins, particularly the propylene polymers, are preferable in terms of spinning stability and stretching processability of the nonwoven fabric.

The propylene polymers have a melting point (Tm) of 155° C. or above, preferably in the range of 157 to 165° C. Preferred examples of the propylene polymers include propylene homopolymer and copolymers of propylene and small amounts of one or more α-olefins having 2 or more, preferably 2 to 8 carbon atoms (excluding the C3 α-olefin), such as ethylene, 1-butene, 1-pentene, 1-hexene, 1-octene and 4-methyl-1-pentene.

The melt flow rate (MFR: ASTM D1238, 230° C., 2160 g load) of the propylene polymers is not particularly limited as long as the molten polymers are spinnable. The MFR is usually in the range of 1 to 1000 g/10 min, preferably 5 to 500 g/10 min, more preferably 10 to 100 g/10 min. The propylene polymers usually have a ratio of the weight-average molecular weight (Mw) to the number-average molecular weight (Mn) (Mw/Mn) in the range of 1.5 to 5.0. The Mw/Mn is preferably in the range of 1.5 to 3.0, in which case the polymers show good spinnability and produce strong fibers. The Mw and Mn may be determined by known GPC (gel permeation chromatography).

The propylene polymer may be combined with a small amount of HDPE. In terms of spinnability and stretching processability, HDPE may be preferably added in an amount of 1 to 20 wt %, more preferably 2 to 15 wt %, still more preferably 4 to 10 wt % based on the total (100 wt %) of the propylene polymer and HDPE. The use of this olefin polymer composition improves stretching processability of the nonwoven fabric laminate.

The density of HDPE added to the propylene polymer is not particularly limited, and is usually in the range of 0.94 to 0.97 g/cm$^3$, preferably 0.95 to 0.97 g/cm$^3$, more preferably 0.96 to 0.97 g/cm$^3$. The melt flow rate (MFR: ASTM D1238, 190° C., 2160 g load) of HDPE is not particularly limited as long as it is spinnable. To obtain expandability, the MFR is usually in the range of 0.1 to 100 g/10 min, preferably 0.5 to 50 g/10 min, more preferably 1 to 30 g/10 min. In the invention, good spinnability means that the filaments are not broken and are not fused together when they are extruded from a spinneret and drawn.

<Additives>

The mixed-fiber spunbonded nonwoven fabrics and meltblown nonwoven fabrics in the invention may contain additives as required, such as stabilizers including heat stabilizers and weathering stabilizers, antistatic agents, slip agents, antifogging agents, lubricants, dyes, pigments, natural oils, synthetic oils and waxes.

The stabilizers include anti-aging agents such as 2,6-di-t-butyl-4-methylphenol (BHT); phenolic antioxidants such as tetrakis[methylene-3-(3,5-di-t-butyl-4-hydroxyphenyl)propionate]methane, alkyl 6-(3,5-di-t-butyl-4-hydroxyphenyl) propionates, 2,2'-oxamidobis[ethyl-3-(3,5-di-t-butyl-4-hydroxyphenyl)]propionate and Irganox 1010 (trade name, hindered phenolic antioxidant); metal salts of fatty acids, such as zinc stearate, calcium stearate and calcium 1,2-hydroxystearate; and fatty acid esters of polyhydric alcohols, such as glycerin monostearate, glycerin distearate, pentaerythritol monostearate, pentaerythritol distearate and pentaerythritol tristearate. These stabilizers may be used singly or in combination of two or more kinds.

<Mixed-Fiber Spunbonded Nonwoven Fabric>

The mixed-fiber spunbonded nonwoven fabric for the laminate of the invention is composed of mixed fibers including 10 to 90 wt % of continuous fibers of the thermoplastic elastomer (A) and 90 to 10 wt % of continuous fibers of the thermoplastic resin (B) ((A)+(B)=100 wt %) In terms of elasticity and softness, the mixed-fiber spunbonded nonwoven fabric preferably includes not less than 20 wt %, more preferably not less than 30 wt % of the continuous fibers of the thermoplastic elastomer (A). In terms of processability (non-stickiness), the mixed-fiber spunbonded nonwoven fabric preferably includes not more than 70 wt %, more preferably not more than 60 wt % of the continuous fibers of the thermoplastic elastomer (A).

The continuous fibers of the thermoplastic elastomer (A) and those of the thermoplastic resin (B) usually have an average fiber diameter of not more than 50 μm, preferably not more than 40 μm, more preferably not more than 30 μm. The fiber diameters of these two types of continuous fibers may be the same or different.

In terms of softness and breathability in sanitary applications such as diapers, the total basis weight of the mixed-fiber spunbonded nonwoven fabrics in the laminate is generally not more than 120 g/m$^2$, preferably not more than 80 g/m$^2$, more preferably not more than 50 g/m$^2$, still more preferably in the range of 40 to 15 g/m$^2$.

The mixed-fiber spunbonded nonwoven fabrics may be laminated with each other or with the meltblown nonwoven fabric(s) by known entangling methods. When the laminate is produced off line, fibers may be wound without being entangled. Lightly entangling fibers by known prebonding improves the productivity. For example, the fibers may be deposited on a transfer belt and may be press bonded with nip rolls, preferably hot nip rolls. The prebonding methods include use of needle punches, waterjet and ultrasonic waves, hot embossing with embossing rolls, and hot air bonding. Preferably, the fibers are entangled more lightly than normal, in which case the obtainable laminate shows good texture and elasticity.

The mixed-fiber spunbonded nonwoven fabrics of the invention may be produced by spunbonding the thermoplastic elastomer (A) and the thermoplastic resin (B) by a known method, for example as described in JP-A-2004-244791.

Specifically, the thermoplastic elastomer (A) and the thermoplastic resin (B) are molten in respective extruders. They are separately introduced to a common spinneret (die) and extruded simultaneously through respective orifices (nozzles) to produce continuous fibers of the thermoplastic elastomer (A) and continuous fibers of the thermoplastic resin (B). The continuous fibers are then quenched with cooling air in a cool chamber, drawn (attenuated) with drawing air, and deposited on a moving collecting surface. The heating temperature in the extruders is not particularly limited and may be determined appropriately depending on the polymers used. However, the heating temperature should be not less than the softening or melting temperatures and below the thermal decomposition temperatures of the polymers. The spinneret temperature may be determined appropriately depending on the polymers used. When the thermoplastic elastomer (A) is the thermoplastic polyurethane elastomer or the elastomeric olefin copolymer, and the thermoplastic resin (B) is the propylene polymer or the olefin polymer composition (propylene polymer and HDPE), the spinneret temperature is usually in the range of 180 to 240° C., preferably 190 to 230° C., more preferably 200 to 225° C.

The temperature of the cooling air is not particularly limited as long as the polymers are solidified. It is usually in the range of 5 to 50° C., preferably 10 to 40° C., more preferably 15 to 30° C. The velocity of the drawing air is usually in the range of 100 to 10,000 m/min, preferably 500 to 10,000 m/min.

<Meltblown Nonwoven Fabric>

The meltblown nonwoven fabric for the laminate of the invention may be composed of a thermoplastic polymer. The thermoplastic polymer may be selected from the thermoplastic elastomers (A) and the thermoplastic resins (B) used in the mixed-fiber spunbonded nonwoven fabrics.

The thermoplastic polymer may be the thermoplastic elastomer (A) or the thermoplastic resin (B) as described above.

In terms of forming properties, the thermoplastic polymer for the meltblown nonwoven fabric preferably has a molecular weight lower than those of the thermoplastic elastomer (A) and the thermoplastic resin (B) of the spunbonded nonwoven fabrics. That is, the thermoplastic polymer preferably has a higher MFR (lower melt viscosity) than those described with respect to the thermoplastic elastomer (A) and the thermoplastic resin (B).

When the thermoplastic polymer for the meltblown nonwoven fabric is the thermoplastic resin (B), particularly polyolefin resin, the MFR of the resin is usually in the range of 50 to 3000 g/10 min, preferably 100 to 2000 g/10 min, more preferably 200 to 1500 g/10 min. The MFR may be adjusted by directly controlling the polymerization. Alternatively, in the case of heat-decomposable resins such as polypropylene, an organic peroxide may be added to the resin to control the MFR. This MFR also applies to the thermoplastic elastomer (A) used as the material of the meltblown nonwoven fabric.

When the thermoplastic resin is used as the material of the meltblown nonwoven fabric, the fibers usually have an average fiber diameter of not more than 10 µm, preferably not more than 5 µm, more preferably in the range of 3 to 0.5 µm. When the thermoplastic elastomer is used as the material of the meltblown nonwoven fabric, the fibers usually have an average fiber diameter of not more than 50 µm, preferably not more than 40 µm, more preferably not more than 30 µm, still more preferably in the range of 20 to 5 µm.

In terms of softness and breathability in sanitary applications such as diapers, the basis weight of the meltblown nonwoven fabric is generally not more than 40 g/m$^2$, preferably in the range of 40 to 0.1 g/m$^2$, more preferably 20 to 0.1 g/m$^2$, still more preferably 10 to 0.1 g/m$^2$, most preferably 5 to 0.1 g/m$^2$.

The single meltblown nonwoven fabric is often laminated with other nonwoven fabrics off line, except when the meltblown nonwoven fabric has a basis weight of less than 5 g/m$^2$ or is sticky. In such cases, lightly prebonding the meltblown fibers by known entangling improves the productivity. For example, the fibers may be deposited on a transfer belt and may be press bonded with nip rolls, preferably hot nip rolls. The prebonding methods include use of needle punches, waterjet and ultrasonic waves, hot embossing with embossing rolls, and hot air bonding. Preferably, the fibers are entangled more lightly than normal, in which case the obtainable laminate shows good texture and elasticity.

<Nonwoven Fabric Laminate>

The nonwoven fabric laminate according to the present invention includes at least one meltblown nonwoven fabric layer (M) and mixed-fiber spunbonded nonwoven fabric layers (S) on both surfaces of the meltblown nonwoven fabric layer. As already described, the mixed-fiber spunbonded nonwoven fabric layers each comprise mixed fibers including 10 to 90 wt % of continuous fibers of the thermoplastic elastomer (A) and 90 to 10 wt % of continuous fibers of the thermoplastic resin (B) ((A)+(B)=100 wt %).

The nonwoven fabric laminate may be constituted of three or more such layers, with examples including S/M/S, S/M/M/S, S/M/S/S, S/S/M/S/S, S/M/M/M/S, S/M/M/S/S, S/S/M/M/S/S, S/M/S/M/S and S/M/M/S/M/M/S. Two or more identical layers may be adjacent to each other as long as the spunbonded nonwoven fabric layers (S) are on both surfaces of the meltblown nonwoven fabric layer (M).

In the nonwoven fabric laminate, the meltblown nonwoven fabric layers (M) are composed of the thermoplastic polymers that are in the same category as the thermoplastic elastomers (A) and/or the thermoplastic resins (B) of the mixed-fiber spunbonded nonwoven fabric layers (S). Consequently, the peel strength between the layers (S) and (M) is increased and the fuzz resistance is improved.

In the nonwoven fabric laminate, the meltblown nonwoven fabric layers and the mixed-fiber spunbonded nonwoven fabric layers in combination provide good elasticity. For example, when the nonwoven fabric laminate is stretched 100%, the residual strain is less than 50%, preferably not more than 40%, more preferably not more than 30%. If the residual strain is 50% or above, the laminate used in a sanitary disposable diaper as a back sheet or a gather will not follow the body contour sufficiently, causing uncomfortable feeling and excretion leakage.

The nonwoven fabric laminate has high elasticity, and the maximum elongation is generally 50% or above, preferably 70% or above, more preferably 100% or above, most preferably 150% or above. Consequently, the nonwoven fabric laminate will not be broken when a user puts on or wears a product having the laminate, and therefore the nonwoven fabric laminate may be suitably used in applications requiring elasticity, such as medical materials, sanitary materials and industrial materials.

The nonwoven fabric laminate has high water resistance. The water pressure resistance thereof is not less than 60 mm H$_2$O, preferably not less than 70 mm H$_2$O, more preferably not less than 80 mm H$_2$O. When the water pressure resistance is less than 60 mm H$_2$O, the water resistance is so insufficient that the laminate used in a sanitary disposable diaper as a back sheet or a gather will not be able to prevent excretion leakage.

The nonwoven fabric laminate has high strength and the maximum strength per basis weight of a 50 mm wide portion is usually in the range of 0.05 to 2 N/basis weight, preferably 0.1 to 2 N/basis weight. Consequently, the nonwoven fabric laminate will not be broken when a user puts on or wears a product having the laminate, and therefore the nonwoven fabric laminate may be suitably used in applications such as medical materials, sanitary materials and industrial materials.

The nonwoven fabric laminate may include one or more nonwoven fabric layers or breathable films on one or both surfaces of the laminate. Such nonwoven fabric layers or breathable films may be laminated (bonded) to the laminate directly or through an adhesive layer or the like.

To produce the nonwoven fabric laminate of the invention, the mixed-fiber spunbonded nonwoven fabric, the meltblown nonwoven fabric and the mixed-fiber spunbonded nonwoven fabric are laminated in line, and the fibers are entangled by a known method. Alternatively, the laminate may be produced partly off line. Specifically, the thermoplastic polymer may be meltblown to the mixed-fiber spunbonded nonwoven fabric layer entangled by a known method, and the second mixed-fiber spunbonded nonwoven fabric layer entangled by a known method may be laminated on the meltblown nonwoven fabric layer.

When the meltblown nonwoven fabric has a basis weight of less than 5 g/m$^2$ or is sticky, the laminate is preferably produced in line.

After the mixed-fiber spunbonded nonwoven fabric layers and the meltblown nonwoven fabric layer are laminated, the fibers may be entangled by an established method, for example using needle punches, waterjet or ultrasonic waves. The fibers may be partially fused by hot embossing with embossing rolls, or hot air bonding. These entangling methods may be performed singly or in combination.

When the fibers are fused by hot embossing, the embossing rolls generally have an embossing area percentage of 5 to 20%, preferably 5 to 10%, and a non-embossing unit area of not less than 0.5 mm$^2$, preferably in the range of 4 to 40 mm$^2$. The non-embossing unit area is a maximum area of an inscribed minimum quadrangle unit surrounded by bosses. The bosses are continuous and are sphere, ellipse, square, rhombus, rectangle, quadrangle or the like in shape. Such embossing rolls produce a plurality of point bonds bonding the continuous fibers of the thermoplastic elastomer (A) and the continuous fibers of the thermoplastic resin (B) together. Moreover, the embossing rolls produce a plurality of point bonds substantially bonding the mixed-fiber spunbonded nonwoven fabric layers and the meltblown nonwoven fabric layer together. In the mixed-fiber spunbonded nonwoven fabric layers, the extensible but inelastic continuous fibers of the thermoplastic resin (B) are substantially lower in elasticity than the elastic continuous fibers of the thermoplastic elastomer (A), and these continuous fibers have high degrees of freedom among the point bonds. In the meltblown nonwoven fabric layer, the meltblown fibers have a high degree of freedom among the point bonds. The nonwoven fabric laminate having this structure has reduced residual strain and good elasticity.

Embossing with a high embossing area percentage results in low elongation but improves the elastic recovery. Embossing with a low embossing area percentage permits high elongation, but the larger boss pitches tend to invite relatively large residual strain. The meltblown nonwoven fabric made of the thermoplastic elastomer achieves reduced residual strain because of point bonds among the fibers.

The nonwoven fabric laminate of the invention includes the meltblown nonwoven fabric layer and the mixed-fiber spunbonded nonwoven fabric layers on both surfaces of the meltblown nonwoven fabric layer. This structure reduces the possibility of curls, snaking and fuzz during the processing such as stretching and embossing. Furthermore, the laminate having the above structure is unlikely to adhere to stretching rolls, gear stretching rolls or embossing rolls and thereby achieves high processability.

The nonwoven fabric laminate may be stretched. Prior to the stretching, the nonwoven fabric laminate may be entangled by the method described hereinabove, preferably by embossing.

In the nonwoven fabric laminate, the continuous fibers constituting the mixed-fiber spunbonded nonwoven fabric layers have different elasticity. Therefore, when the nonwoven fabric laminate is stretched, the continuous fibers of the thermoplastic elastomer (A) produce elastic recovery to almost the original length, whilst the continuous fibers of the thermoplastic resin (B) do not substantially contract. Consequently, the continuous fibers of the thermoplastic resin (B) produce waves on the surface of the laminate, giving more bulkiness and softness.

When the additional nonwoven fabrics or breathable films are laminated on the nonwoven fabric laminate of the present invention through a hot melt adhesive, the meltblown nonwoven fabric layer(s) prevents the hot melt adhesive from leaking to the surface and thereby prevents stickiness. Consequently, the laminate shows no stickiness and has high processability.

The nonwoven fabric laminate may include one or more additional layers on one or both surfaces of the mixed-fiber spunbonded nonwoven fabric layers. Such additional layers are not particularly limited and may be selected appropriately depending on the use of the laminate.

Examples of the additional layers include knitted fabrics, woven fabrics, nonwoven fabrics and films. These layers may be laminated (bonded) on the nonwoven fabric laminate by known methods including heat bonding methods such as hot embossing and ultrasonic bonding; mechanical entangling methods such as needle pouncing and water jetting; use of adhesives such as hot melt adhesives and urethane adhesives; and extrusion lamination.

Examples of the additional nonwoven fabrics employable in the nonwoven fabric laminate of the invention include spunbonded nonwoven fabrics, wet nonwoven fabrics, dry nonwoven fabrics, dry nonwoven pulp fabrics, flash spun nonwoven fabrics and open mesh nonwoven fabrics. These nonwoven fabrics may be inelastic. As used herein, the inelastic nonwoven fabrics have about 50% elongation at break in the machine direction (MD) or the cross direction (CD) and possess no recovery force after the extension.

The films used in the nonwoven fabric laminate of the invention are preferably breathable films (moisture permeable films) that do not hinder the characteristic breathability of the nonwoven fabric laminate. Conventional breathable films are usable, with examples including moisture permeable films of thermoplastic elastomers such as polyurethane elastomers, polyester elastomers and polyamide elastomers; and porous films produced by expanding films of thermoplastic resins which contain inorganic or organic fine particles to produce a plurality of pores. Preferred examples of the thermoplastic resins for the porous films include polyolefins such as high-pressure low-density polyethylene, linear low-density polyethylene (LLDPE), high-density polyethylene, polypropylene, polypropylene random copolymers and compositions thereof.

The nonwoven fabric laminate with the breathable films is a cloth-like composite material that has inherent softness and very high water resistance.

EXAMPLES

The present invention will be described by Examples without limiting the scope of the invention.

In Examples and Comparative Examples, properties were determined as follows.

(1) Basis Weight (g/m$^2$)

Six test pieces 200 mm (MD) and 50 mm (CD) in size were removed from the nonwoven fabric and/or the nonwoven fabric laminate. This sampling took place at arbitrary 3 regions in MD and arbitrary 3 regions in CD (6 regions in total). The test pieces were each weighed in grams using a pan electronic balance (manufactured by Kensei Kogyo Co., Ltd.). The average mass of the test pieces was obtained. From the average mass, the mass per 1 m$^2$ was calculated and was rounded off to the first decimal place to obtain a basis weight (g/m$^2$) of each nonwoven fabric sample.

(2) Maximum Strength (N/50 mm) and Maximum Elongation (%)

These properties were measured in accordance with JIS L1906. Six test pieces 200 mm (MD) and 50 mm (CD) in size were removed from the nonwoven fabric and/or the nonwoven fabric laminate. This sampling took place at arbitrary 3 regions in MD and arbitrary 3 regions in CD (6 regions in total). The test pieces were each held with chucks 100 mm apart from each other ($I_0$=100 mm) and were stretched at a stress rate of 100 mm/min using a universal tensile tester (IM-201 manufactured by Intesco Corporation) to obtain the maximum strength (N/50 mm) and the elongation at the maximum strength (maximum elongation (%)). The maximum strength of the six test pieces (three for MD and three for CD) was averaged and was rounded off to the first decimal place. The maximum elongation of the six test pieces (three for MD and three for CD) was averaged and was rounded off to the nearest integer.

(3) Residual Strain (%)

Six test pieces 200 mm (MD) and 50 mm (CD) in size were removed from the nonwoven fabric and/or the nonwoven fabric laminate. This sampling took place at arbitrary 3 regions in MD and arbitrary 3 regions in CD (6 regions in total). The test pieces were each held with chucks 100 mm apart from each other and were stretched 100% at a stress rate of 100 mm/min using a universal tensile tester (IM-201 manufactured by Intesco Corporation). The stress was released at the same rate as the stress rate, and the residual strain (%) was determined. The residual strain of the six test pieces (three for MD and three for CD) was averaged and was rounded off to the first decimal place.

(4) Maximum Strength Per Basis Weight (N/Basis Weight)

The maximum strength (2) was divided by the basis weight (1) to obtain the maximum strength per basis weight (N/basis weight).

(5) Water Pressure Resistance (mm $H_2O$)

The water pressure resistance was determined in accordance with JIS L1092. Six test pieces 200 mm (MD) and 50 mm (CD) in size were removed from the nonwoven fabric and/or the nonwoven fabric laminate. This sampling took place at arbitrary 3 regions in MD and arbitrary 3 regions in CD (6 regions in total). The test pieces were each attached to a water resistance tester (TESTER SANGYO CO., LTD.) such that the surface of the test piece would be contacted with water. A track level containing room-temperature water was elevated at a rate of 60±30 mm/min or 10±5 mm/min to apply water pressure to the test piece. The water pressure resistance (mm $H_2O$) was determined by reading the water level when water leaked from three regions on the opposite side of the test piece. The water pressure resistance of the six test pieces (three for MD and three for CD) was averaged and was rounded off to the nearest integer.

(6) Air Permeability ($cc/cm^2/sec$)

The air permeability was determined by the fragile method in accordance with JIS L1096. Six test pieces 200 mm (MD) and 50 mm (CD) in size were removed from the nonwoven fabric and/or the nonwoven fabric laminate. This sampling took place at arbitrary 3 regions in MD and arbitrary 3 regions in CD (6 regions in total). The test pieces were each tested for air permeability ($cc/cm^2/sec$) using an air permeability tester (Shimadzu Corporation). The air permeability of the six test pieces (three for MD and three for CD) was averaged and was rounded off to the nearest integer.

(7) Fuzz Resistance (Points)

Twelve test pieces 200 mm (MD) and 25 mm (CD) in size were removed from the nonwoven fabric and/or the nonwoven fabric laminate. This sampling took place at arbitrary 3 regions, each sampling two test pieces in MD and two test pieces in CD (for evaluation of the embossed surface (upper surface) and the flat surface (back surface)) (12 regions in total). The test pieces were each tested for fuzz resistance using an abrasion tester II (NR-100 manufactured by DAIEI KAGAKU SEIKI MFG. Co., Ltd.) as follows.

A 200 g friction block was used. Packing adhesive tape (cloth) No. 153 (manufactured by Teraoka Seisakusho Co., Ltd.) was placed such that the adhesive surface of the tape would rub the testing surface of the test piece. To prevent the test piece from moving during the test, sandpaper (No. 400) was fitted to a table of the tester with the abrasive surface upward. The test piece was placed on the abrasive surface and was fitted to the tester table with the testing surface upward. The testing surface of the test piece and the non-adhesive surface of the adhesive tape were rubbed against each other back and forth 50 times.

The rubbed surface of the test piece was observed, and the fuzz resistance was graded based on the following criteria.

1 point: There was no fuzz.
2 points: A small fuzzball was about to form.
3 points: A recognizable fuzzball was about to form, and a plurality of small fuzzballs formed.
4 points: Recognizable large fuzzballs formed, and the fibers were lifted locally.
5 points: The fibers were torn off and the test piece became thin.
6 points: The fibers were torn off and the test piece was broken.

The test pieces for testing the upper surface were rubbed on the upper surface, and the test pieces for testing the back surface were rubbed on the back surface. The fuzz resistance (points) of the twelve test pieces (six test pieces for testing the upper surface and six test pieces for testing the back surface) was averaged and was rounded off to the first decimal place.

(8) Curling in Nonwoven Fabric Laminate

A test piece 200 mm (MD) and 50 mm (CD) in size was removed from the nonwoven fabric and/or the nonwoven fabric laminate. The test piece was placed on a desk with its upper surface upward and subsequently with its back surface upward, and curls were visually inspected. When the nonwoven fabric placed on its upper surface or back surface was locally lifted from the desk, the nonwoven fabric had curls. When there was no lifting, the nonwoven fabric had no curls.

(9) Fiber Diameter (μm)

<Diameter of Fibers in Meltblown Nonwoven Fabric>

A test piece 15 mm×15 mm in size was removed from a 20 cm wide portion (in CD) of the meltblown nonwoven fabric except both ends of the fabric each 20 cm in width. The diameter of 50 fibers was read in μm to the second decimal place with use of an electron microscope (S-3500 N manufactured by Hitachi, Ltd.), then averaged and rounded off to the first decimal place.

<Diameter of Fibers in Mixed-Fiber Spunbonded Nonwoven Fabric>

A test piece 15 mm×15 mm in size was removed from a 20 cm wide portion (in CD) of the mixed-fiber spunbonded nonwoven fabric except both ends of the fabric each 20 cm in width. The diameter of arbitrary 10 thick fibers and that of arbitrary 10 thin fibers were separately read in μm to the second decimal place with use of an electron microscope (S-3500 N manufactured by Hitachi, Ltd.), then averaged and rounded off to the first decimal place. It is generally accepted that when the thermoplastic elastomer (A) and the thermoplastic resin (B) are extruded through orifices with the same output per orifice, continuous fibers of the thermoplastic elastomer (A) will surpass continuous fibers of the thermoplastic resin (B) in fiber diameter because of elastic recovery. Based on this, the continuous fibers with larger diameters were considered to be the thermoplastic elastomer (A), and the continuous fibers with small diameters were considered to be the thermoplastic resin (B).

(10) Stickiness

The nonwoven fabric and/or the nonwoven fabric laminate was evaluated for stickiness by 10 panelists based on the following criteria. The stickiness was evaluated before and after stretching (before and after the measurement of residual strain (3)).

AA: 10 out of the 10 panelists answered that the fabric was nonsticky and nice to the touch.

BB: 9 to 7 out of the 10 panelists answered that the fabric was nonsticky and nice to the touch.

CC: 6 to 3 out of the 10 panelists answered that the fabric was nonsticky and nice to the touch.

DD: 2 to 0 out of the 10 panelists answered that the fabric was nonsticky and nice to the touch.

(11) Fuzz

The nonwoven fabrics were hot embossed singly and/or together into a laminate. Whether the nonwoven fabrics and fibers adhered to the embossing rolls and other following apparatuses was visually observed. When the nonwoven fabrics and fibers adhered to the rolls, fuzz resulted. When there was no adhesion of the nonwoven fabrics and fibers, no fuzz resulted.

The thermoplastic polyurethane elastomers (TPU) used in Examples and Comparative Examples were analyzed and tested by the following methods.

(12) Solidifying Point

The solidifying point was obtained on a differential scanning calorimeter (DSC 220C) connected to Disc Station Model SSC 5200H (manufactured by Seiko Instruments Inc.). Approximately 8 mg of the ground TPU as sample was weighed on an aluminum pan, which was then covered and crimped. A reference was prepared in the same manner using alumina. After the sample and the reference were put in place in the cell, an experiment was carried out in a nitrogen stream at a flow rate of 40 N ml/min. The temperature was raised from room temperature to 230° C. at a rate of 10° C./min, held constant for 5 minutes, and lowered to −75° C. at a rate of 10° C./min. From the plots recorded in this experiment, the temperature at which the exothermic peak attributed to the solidification of TPU appeared was determined as the solidifying point (° C.).

(13) Number of Polar Solvent-Insoluble Particles

The polar solvent-insoluble particles were counted on particle size distribution analyzer Multisizer II (manufactured by Beckman Coulter, Inc.) by an electric sensing zone method. A 5-L separable flask was charged with 3500 g of dimethylacetamide (Special Grade, available from Wako Pure Chemical Industries, Ltd.) and 145.83 g of ammonium thiocyanate (special grade, available from JUNSEI CHEMICAL CO., LTD.). They were brought to a solution at room temperature over a period of 24 hours.

The solution was filtered through a 1 μm-membrane filter under reduced pressure to give a reagent A. Thereafter, 180 g of the reagent A and 2.37 g of TPU pellets were precisely weighed into a 200 cc glass bottle. Soluble components in TPU were allowed to dissolve over a period of 3 hours. The solution thus obtained was used as a specimen. A 100 μm-aperture tube was attached to the Multisizer II, and the existing solvent in the analyzer was replaced by the reagent A. The pressure was reduced to nearly 3000 mmAq. The reagent A was weighed in an amount of 120 g into a beaker which had been sufficiently washed. Blank measurement was carried out to provide that pulses appeared at a rate of 50 or less per minute. After the optimum current and gain had been manually set, calibration was made using 10 μm uncrosslinked polystyrene particles as standards. To carry out the measurement, a sufficiently washed beaker was charged with 120 g of the reagent A and about 10 g of the specimen. The measurement was conducted for 210 seconds. The number of particles counted during this experiment was divided by the weight of TPU introduced into the aperture tube to obtain the number of the polar solvent-insoluble particles in TPU (particles/g). The TPU weight was calculated by the following formula:

$$TPU\ weight = \{(A/100) \times B/(B+C)\} \times D$$

wherein A is a TPU concentration (wt %) in the specimen, B is a weight (g) of the specimen weighed in the beaker, C is a weight (g) of the reagent A weighed in the beaker, and D is a weight (g) of the solution introduced into the aperture tube during the measurement (210 seconds).

(14) Percentage of Heat of Fusion Attributed to Hard Domains

The percentage of the heat of fusion attributed to the hard domains was obtained on a differential scanning calorimeter (DSC 220C) connected to Disc Station Model SSC 5200H (Seiko Instruments Inc.). Approximately 8 mg of ground TPU as sample was placed on an aluminum pan, which was then covered and crimped. A reference was prepared in the same manner using alumina. After the sample and the reference were put in place in the cell, an experiment was carried out in a nitrogen stream at a flow rate of 40 N ml/min. The temperature was raised from room temperature to 230° C. at a rate of 10° C./min. From the plots recorded in this experiment, the total heat of fusion (a) obtained from endothermic peaks within the temperature range of from 90 to 140° C. and the total heat of fusion (b) obtained from endothermic peaks within the temperature range of from above 140 to 220° C. were obtained. The percentage of the heat of fusion attributed to the hard domains was determined by the following formula:

$$\text{Heat of fusion (\%)} = a/(a+b) \times 100$$

(15) Melt Viscosity at 200° C. (Hereinafter, Simply Melt Viscosity)

TPU was measured for melt viscosity (Pa·s) at 200° C. and a shear rate of 100 sec$^{-1}$ on Capirograph Model 1C (manufactured by Toyo Seiki K.K.) having a nozzle 30 mm in length and 1 mm in diameter.

(16) Water Content in TPU

The water content (ppm) in TPU was measured on water content measurement device Model AVQ-5S and evaporator Model EV-6 (both available from HIRANUMA SANGYO Co., Ltd.). Approximately 2 g of TPU pellets were weighed on a pan and introduced into a 250° C. hot oven. The evaporated water was led to a water-free titration cell of the water content measurement device, and titration was performed using a Karl Fischer reagent. When the voltage between the electrodes was constant for 20 seconds, the water content in the cell was considered to have ceased to increase and therefore the titration was terminated.

(17) Shore A Hardness

TPU was tested in accordance with JIS K7311 at 23° C. and 50% RH to determine the hardness. A durometer A was used in the test.

<TPU Production Example 1>

In an atmosphere of nitrogen, diphenylmethane diisocyanate (hereinafter "MDI") was placed in a tank A and heated to 45° C. with agitation while avoiding bubbles.

Separately, a tank B was charged under a nitrogen atmosphere with 628.6 parts by weight of a polyester polyol having a number-average molecular weight of 2000 (trade name: TAKELAC U2024, manufactured by Mitsui Takeda Chemicals, Inc.), 2.21 parts by weight of Irganox 1010 and 77.5 parts by weight of 1,4-butanediol. They were brought to 95° C. with agitation. This mixture will be refereed to as the polyol solution 1.

From the amounts of these reaction materials, the amount of hard segments was calculated to be 37.1 wt %.

Thereafter, MDI and the polyol solution 3 were supplied though liquid-supply lines with gear pumps and flow meters at flow rates of 17.6 kg/h and 42.4 kg/h respectively to a high-speed stirrer (SM40) temperature controlled at 120° C. They were mixed together by stirring at 2000 rpm for 2 minutes, and the liquid mixture was passed though a series of static mixers. The static mixers consisted of a series of 1st to 3rd static mixers 0.5 m in total length and 20 mm in inner diameter (temperature: 230° C.), 4th to 6th static mixers 0.5 m in total length and 20 mm in inner diameter (temperature: 220° C.), 7th to 12th static mixers 1.0 m in total length and 34 mm in inner diameter (temperature: 210° C.), and 13th to 15th static mixers 0.5 m in total length and 38 mm in inner diameter (temperature: 200° C.).

The reaction product discharged from the 15th static mixer was introduced via a gear pump into a single-screw extruder (65 mm in diameter, temperature controlled at 180 to 210° C.) fitted with a polymer filter (DENA FILTER, manufactured by NAGASE & CO. LTD.), and was extruded through a strand die. The resulting strands were cooled with water and consecutively pelletized with a pelletizer. The pellets were placed in a dryer at 100° C. over a period of 8 hours, resulting in a thermoplastic polyurethane elastomer with a water content of 40 ppm. The thermoplastic polyurethane elastomer was continuously extruded using a single-screw extruder (50 mm in diameter, temperature controlled at 180 to 210° C.). The resulting strands were pelletized. The pellets were dried again at 100° C. over a period of 7 hours to give a thermoplastic polyurethane elastomer (TPU-1) with a water content of 57 ppm.

The tests provided that TPU-1 had a solidifying point of 103.7° C. and contained 1,500,000 polar solvent-insoluble particles per g. Separately, TPU-1 was injection molded to prepare a specimen, which showed a hardness of 86 A and a 200° C. melt viscosity of 1900 Pa·s. The heat of fusion attributed to the hard domains was found to be 35.2%.

Example 1

<Preparation of Thermoplastic Resin Composition for Spunbonded Nonwoven Fabric>

96 parts by weight of a propylene homopolymer (hereinafter "PP-1") that had MFR (ASTM D1238, 230° C., 2.16 kg load) of 60 g/10 min, a density of 0.91 g/cm$^3$ and a melting point of 160° C., and 4 parts by weight of a high-density polyethylene (hereinafter "HDPE") that had MFR (ASTM D1238, 190° C., 2.16 kg load) of 5 g/10 min, a density of 0.97 g/cm$^3$ and a melting point of 134° C. were mixed together to give a thermoplastic resin composition (B-1).

<Production of Nonwoven Fabric Laminate>

TPU-1 obtained in Production Example 1 and the thermoplastic resin composition (B-1) were molten in respective extruders (30 mm in diameter) and subsequently spun with a spunbond machine (100 mm in length perpendicular to the machine direction of the collecting surface) having a spinneret, at resin and spinneret temperatures of 220° C., a cooling air temperature of 20° C., and a drawing air velocity of 3000 m/min. Continuous fibers A of TPU-1 and continuous fibers B of B-1 were deposited on the collecting surface to form a web. The spinneret had orifices for TPU-1 and orifices for B-1 that were arranged alternately. The orifices were 0.6 mm in diameter and had pitches of 8 mm longitudinally and 8 mm transversely. The numerical ratio of the orifices for the fibers A and those for the fibers B was 1:3. The outputs of the fibers A and the fibers B were 0.6 g/min and 0.6/min per orifice respectively.

The continuous fibers forming the web on the belt were press bonded with nip rolls coated with a non-adhesive material at 80° C. and a linear pressure of 10 kg/cm. Consequently, a mixed-fiber spunbonded nonwoven fabric with a basis weight of 15 g/m$^2$ was obtained.

The mixed-fiber spunbonded nonwoven fabric was transferred on a moving belt. TPU-1 was extruded on the spunbonded nonwoven fabric with use of a meltblowing machine having orifices 0.4 mm in diameter. Specifically, TPU-1 was extruded from the spinneret at a resin temperature of 235° C. and with an output of 0.2 g/orifice/min, and the filaments were attenuated with hot air (235° C., 5 Nm$^3$/cm/hr) from both sides of the spinneret and were quenched. Consequently, filaments having an average fiber diameter of about 18 μm were produced. The filaments were blown onto the mixed-fiber spunbonded nonwoven fabric on the conveyer net that was 15 cm away from the spinneret. Simultaneously, a suction device positioned immediately below the conveyer net drew the filaments at 10 Nm$^3$/cm/hr against the conveyer net. The resulting meltblown nonwoven fabric had a basis weight of 6 g/m$^2$. A mixed-fiber spunbonded nonwoven fabric separately prepared as described above was laminated on the meltblown nonwoven fabric in the downstream of the conveyer belt.

The laminate was released from the moving belt. The three layers were bonded together by means of hot embossing rolls having an embossing area percentage of 18% and an embossing unit area of 0.41 mm$^2$, at a temperature of 110° C. and a linear pressure of 50 kg/cm. Consequently, a mixed-fiber spunbonded nonwoven fabric/meltblown nonwoven fabric/mixed-fiber spunbonded nonwoven fabric laminate was produced.

Separately, the thermoplastic resin composition (B-1) was singly spunbonded into a spunbonded nonwoven fabric with a basis weight of 18 g/m$^2$. The spunbonded nonwoven fabric was tested by the aforesaid methods, resulting in maximum elongation of 172% in MD and 150% in CD and residual strain of 96% in MD and 98% in CD.

Comparative Example 1

A mixed-fiber spunbonded nonwoven fabric having a basis weight of 20 g/m$^2$ and a meltblown nonwoven fabric having a basis weight of 16 g/m$^2$ were produced in the same manner as in Example 1. No mixed-fiber spunbonded nonwoven fabric was laminated on the meltblown nonwoven fabric. These two layers were embossed under the same conditions as in Example 1 to give a mixed-fiber spunbonded nonwoven fabric/meltblown nonwoven fabric laminate.

Example 2

A mixed-fiber spunbonded nonwoven fabric/meltblown nonwoven fabric/mixed-fiber spunbonded nonwoven fabric laminate was produced in the same manner as in Example 1, except that TPU-1 for the meltblown nonwoven fabric was replaced by a polypropylene homopolymer (MFR (JIS K7210-1999, 230° C., 2.16 kg load): 900 g/10 min), that the polypropylene homopolymer was extruded at 300° C. and attenuated with hot air (300° C.) to an average fiber diameter of about 3 μm, and that the filaments were blown onto the mixed-fiber spunbonded nonwoven fabric that was 20 cm away from the spinneret.

Comparative Example 2

A mixed-fiber spunbonded nonwoven fabric having a basis weight of 20 g/m$^2$ and a meltblown nonwoven fabric having a basis weight of 16 g/m$^2$ were produced in the same manner as in Example 2. No mixed-fiber spunbonded nonwoven fabric was laminated on the meltblown nonwoven fabric. These two layers were embossed under the same conditions as in Example 2 to give a mixed-fiber spunbonded nonwoven fabric/meltblown nonwoven fabric laminate.

Example 3

The nonwoven fabric laminate obtained in Example 1 was stretched 100%. A sprayable hot melt adhesive was applied thereto in an amount of 5 g/m$^2$. A polypropylene spunbonded nonwoven fabric was laminated on the nonwoven fabric laminate, wherein the polypropylene spunbonded nonwoven fabric had a basis weight of 18 g/m² and was composed of fibers with a fiber diameter of 2 d in an extended state. Consequently, these fabrics were bonded together satisfactorily.

Comparative Example 3

A mixed-fiber spunbonded nonwoven fabric with a basis weight of 36 g/m² was prepared. The mixed-fiber spunbonded nonwoven fabric was stretched 100%. A sprayable hot melt adhesive was applied thereto in an amount of 5 g/m². A polypropylene spunbonded nonwoven fabric was laminated on the spunbonded nonwoven fabric, wherein the polypropylene spunbonded nonwoven fabric had a basis weight of 18 g/m² and was composed of fibers with a fiber diameter of 2 d in an extended state. Local insufficient bonds occurred because of the presence of the hot melt adhesive.

TABLE 1

|  | Ex. 1 | Ex. 2 | Comp. Ex. 1 | Comp. Ex. 2 |
|---|---|---|---|---|
| Stickiness before stretching | BB | AA | DD | BB |
| Stickiness after stretching | AA | AA | DD | BB |
| Fuzz | No fuzz | No fuzz | Fuzz | Fuzz |
| Curls | No curls | No curls | Curls | Curls |

Example 4

<Production of Nonwoven Fabric Laminate>

TPU-1 and the thermoplastic resin composition (B-1) used in Example 1 were molten in respective extruders (75 mm and 50 mm in diameter respectively) and subsequently spun with a spunbond machine (800 mm in length perpendicular to the machine direction of the collecting surface) having a spinneret, at resin and spinneret temperatures of 210° C., a cooling air temperature of 20° C., and a drawing air velocity of 3750 m/min. Continuous fibers A of TPU-1 and continuous fibers B of B-1 were deposited on the collecting surface to form a web. The spinneret had orifices for TPU-1 and orifices for B-1 that were arranged alternately. The orifices for TPU-1 (fibers A) were 0.75 mm in diameter and those for B-1 (fibers B) were 0.6 mm in diameter. The orifices had pitches of 8 mm longitudinally and 11 mm transversely. The numerical ratio of the orifices for the fibers A and those for the fibers B was 1:1.45. The outputs of the fibers A and the fibers B were 0.6 g/min and 0.6 g/min per orifice respectively.

The continuous fibers forming the web on the belt were press bonded with nip rolls coated with a non-adhesive material at a linear pressure of 10 kg/cm. Consequently, a mixed-fiber spunbonded nonwoven fabric with a basis weight of 15 g/m² was obtained. The continuous fibers were 26.2 μm and 19.0 μm in diameter. Accordingly, the TPU-1 fiber diameter was 26.2 μm and the B-1 fiber diameter was 19.0 μm.

The mixed-fiber spunbonded nonwoven fabric was transferred on a moving belt. TPU-2 (thermoplastic polyurethane elastomer (Elastolan ET-385 manufactured by BASF Japan Ltd.), solidifying point: 86.9° C., polar solvent-insoluble particles: 2,800,000 particles/g, hardness: 84A, water content: 89 ppm) was extruded on the spunbonded nonwoven fabric with use of a meltblowing machine (50 mm in diameter) having orifices 0.4 mm in diameter. Specifically, TPU-2 was extruded from the spinneret at a resin temperature of 235° C. and with an output of 0.1 g/orifice/min, and the filaments were attenuated with hot air (200° C., 4 Nm³/cm/hr) from both sides of the spinneret and were quenched. Consequently, filaments having an average fiber diameter of about 6.0 μm were produced. The filaments were blown onto the mixed-fiber spunbonded nonwoven fabric on the conveyer net that was 25 cm away from the spinneret. Simultaneously, a suction device positioned immediately below the conveyer net drew the filaments at 10 Nm³/cm/hr against the conveyer net. The resulting meltblown nonwoven fabric had a basis weight of 5 g/m². A mixed-fiber spunbonded nonwoven fabric separately prepared as described above was laminated on the meltblown nonwoven fabric in the downstream of the conveyer belt.

The laminate was released from the moving belt. The three layers were bonded together by means of hot embossing rolls having an embossing area percentage of 18% and an embossing unit area of 0.41 mm², at a temperature of 110° C. and a linear pressure of 30 kg/cm. Consequently, a mixed-fiber spunbonded nonwoven fabric/meltblown nonwoven fabric/mixed-fiber spunbonded nonwoven fabric laminate was produced.

The nonwoven fabric laminate was tested by the aforesaid methods. The results are shown in Table 2.

Example 5

A mixed-fiber spunbonded nonwoven fabric/meltblown nonwoven fabric/mixed-fiber spunbonded nonwoven fabric laminate was produced in the same manner as in Example 4, except that TPU-2 for the meltblown nonwoven fabric was replaced by the polypropylene homopolymer used in Example 2, and that the polypropylene homopolymer filaments were attenuated with hot air at 230° C. and 3.7 Nm³/cm/hr to an average fiber diameter of about 3.0 μm.

The nonwoven fabric laminate was tested by the aforesaid methods. The results are shown in Table 2.

Comparative Example 4

A mixed-fiber spunbonded nonwoven fabric having a basis weight of 17.5 g/m² was produced in the same manner as in Example 4. Two such spunbonded nonwoven fabrics were laminated without any meltblown nonwoven fabric in between in the same manner as in Example 4 to give a mixed-fiber spunbonded nonwoven fabric/mixed-fiber spunbonded nonwoven fabric laminate.

The nonwoven fabric laminate was tested by the aforesaid methods. The results are shown in Table 2.

Comparative Example 5

A mixed-fiber spunbonded nonwoven fabric having a basis weight of 15 g/m² and a meltblown nonwoven fabric having a basis weight of 15 g/m² were produced in the same manner as in Example 4. No mixed-fiber spunbonded nonwoven fabric was laminated on the meltblown nonwoven fabric. These two layers were embossed under the same conditions as in Example 4 to give a mixed-fiber spunbonded nonwoven fabric/meltblown nonwoven fabric laminate.

The nonwoven fabric laminate was tested by the aforesaid methods. The results are shown in Table 2.

Comparative Example 6

A mixed-fiber spunbonded nonwoven fabric having a basis weight of 20 g/m² and a meltblown nonwoven fabric having a basis weight of 15 g/m² were produced in the same manner as in Example 5. No mixed-fiber spunbonded nonwoven fabric was laminated on the meltblown nonwoven fabric. These two layers were embossed under the same conditions as in Example 5 to give a mixed-fiber spunbonded nonwoven fabric/meltblown nonwoven fabric laminate.

The nonwoven fabric laminate was tested by the aforesaid methods. The results are shown in Table 2.

Comparative Example 7

A spunbonded nonwoven fabric/meltblown nonwoven fabric/spunbonded nonwoven fabric laminate was produced in the same manner as in Example 4, except that the mixed-fiber was replaced by PP-1 (fibers B).

The nonwoven fabric laminate was tested by the aforesaid methods. The results are shown in Table 2.

TABLE 2

|  | Ex. 4 | Ex. 5 | Comp. Ex. 4 | Comp. Ex. 5 | Comp. Ex. 6 | Comp. Ex. 7 |
|---|---|---|---|---|---|---|
| Stickiness before stretching | BB | AA | BB | DD | BB | AA |
| Stickiness after stretching | AA | AA | AA | DD | BB | *1 |
| Fuzz | No fuzz | No fuzz | No fuzz | Fuzz | Fuzz | No fuzz |
| Curls | No curls | No curls | No curls | Curls | Curls | No curls |
| Fuzz resistance (points) | 2.2 | 3.5 | 4.5 | 2.9 | 2.9 | 3.8 |
| Basis weight (g/m$^2$) | 36.0 | 34.9 | 35.0 | 34.9 | 35.1 | 35.2 |
| Residual strain in MD (%) | 12.7 | 18.0 | 13.3 | 13.3 | 23.6 | *1 |
| Residual strain in CD (%) | 21.3 | 26.0 | 25.2 | 15.0 | 37.3 | *1 |
| Water pressure resistance (mm H$_2$O) | 90 | 148 | 59 | 67 | 268 | 270 |
| Air permeability (cc/cm$^2$/sec) | 198 | 102 | 250 | 161 | 30 | 51 |
| Maximum strength in MD (N/50 mm) | 31.4 | 36.0 | 34.0 | 24.0 | 40.4 | 86.0 |
| Maximum strength in CD (N/50 mm) | 14.7 | 17.4 | 11.7 | 9.1 | 18.5 | 51.9 |
| Maximum elongation in MD (%) | 157 | 183 | 158 | 140 | 150 | 70 |
| Maximum elongation in CD (%) | 188 | 169 | 142 | 201 | 133 | 71 |
| Maximum strength in MD per basis weight (N/basis weight) | 0.9 | 1.0 | 1.0 | 0.7 | 1.2 | 2.4 |
| Maximum strength in CD per basis weight (N/basis weight) | 0.4 | 0.5 | 0.3 | 0.3 | 0.5 | 1.5 |

*1: Evaluation or measurement failed.

The nonwoven fabric laminates of the invention possess excellent elasticity, softness, moisture permeability, breathability, water resistance, fuzz resistance, curl resistance, strength and interlaminar strength. With these properties, the nonwoven fabric laminates are suitably used as sanitary materials, medical materials and industrial materials. The sanitary materials include absorbent products such as disposable diapers and sanitary items. The nonwoven fabric laminates of the invention possess excellent elasticity, softness, moisture permeability, breathability, water resistance, fuzz resistance, curl resistance, strength and interlaminar strength. With these properties, the nonwoven fabric laminates are suitably used in disposable spreadable diapers (diapers that are spread when users have them on or off) and disposable diaper pants. In particular, the nonwoven fabric laminates are suitably used as top sheets, back sheets, waistbands (extension tapes and side flaps), fastening tapes, three dimensional gathers and leg cuffs of these diapers, and also as side panels of the disposable diaper pants. These parts made of the nonwoven fabric laminates of the present invention are capable of precisely following the contour of the wearer's body during activity, and therefore wear comfort is maintained. Disposable masks are also an exemplary application. The disposable masks are generally composed of a mouth cover and ear loops. The nonwoven fabric laminates of the invention possess excellent elasticity, softness, moisture permeability, breathability, water resistance, fuzz resistance, curl resistance, strength and interlaminar strength. With these properties, the nonwoven fabric laminates are suitably used as disposable masks or ear loops. The medical materials include disposable surgical gowns and rescue gowns. Joints in disposable surgical gowns and rescue gowns, such as arms, elbows, shoulders and sleeves, require breathability and elasticity. The nonwoven fabric laminates of the invention possess inherent breathability and superior elasticity, and are therefore suitably used as bases of joints in disposable surgical gowns and rescue gowns, such as arms, elbows and shoulders. The nonwoven fabric laminates may be bonded with inelastic nonwoven fabrics or breathable films depending on applications, and such laminates also have wide uses.

What is claimed is:

1. A nonwoven fabric laminate comprising at least one meltblown nonwoven fabric layer and mixed-fiber spunbonded nonwoven fabric layers on both surfaces of the at least one meltblown nonwoven fabric layer, the mixed-fiber spunbonded nonwoven fabric layers each comprising mixed fibers including 10 to 90 wt % of continuous fibers of a thermoplastic elastomer (A) and 90 to 10 wt % of continuous fibers of a thermoplastic resin (B) other than the thermoplastic elastomer (A) ((A)+(B)=100 wt %), the meltblown nonwoven fabric layer being composed of a thermoplastic resin (B) other than the thermoplastic elastomer (A), the thermoplastic resin (B) being crystalline polymers having a melting point (Tm) of not less than 100° C., or amorphous polymers having a glass transition temperature of not less than 100° C., the thermoplastic elastomer (A) comprising a polypropylene resin composition comprising:
   1 to 40 wt % of an isotactic polypropylene; and
   60 to 99 wt % of a propylene/ethylene/α-olefin copolymer.

2. A nonwoven fabric laminate comprising at least one meltblown nonwoven fabric layer and mixed-fiber spunbonded nonwoven fabric layers on both surfaces of the at least one meltblown nonwoven fabric layer, the mixed-fiber spunbonded nonwoven fabric layers each comprising mixed fibers including 10 to 90 wt % of continuous fibers of a thermoplastic elastomer (A) and 90 to 10 wt % of continuous fibers of a thermoplastic resin (B) other than the thermoplastic elastomer (A) ((A)+(B)=100 wt %), the meltblown nonwoven fabric layer being composed of a thermoplastic resin (B) other than the thermoplastic elastomer (A), the thermoplastic resin (B) being crystalline polymers having a melting point (Tm) of not less than 100° C., or amorphous polymers having a glass transition temperature of not less than 100° C., the thermoplastic elastomer (A) comprising a polypropylene resin composition comprising:

1 to 40 wt % of an isotactic polypropylene; and 60 to 99 wt % of a propylene/ethylene/α-olefin copolymer, the propylene/ethylene/α-olefin copolymer comprising 45 to 89 mol % of propylene, 10 to 25 mol % ethylene, and less than 30 mol % of α-olefin having 4 to 20 carbon atoms.

3. The nonwoven fabric laminate according to claim 1, wherein the nonwoven fabric laminate has a maximum elongation of 50% or more.

4. The nonwoven fabric laminate according to claim 1, wherein the nonwoven fabric laminate has water pressure resistance of not less than 60 mm $H_2O$.

5. The nonwoven fabric laminate according to claim 1, wherein the nonwoven fabric laminate has maximum strength per basis weight of a 50 mm wide portion of 0.05 to 2 N/basis weight.

6. The nonwoven fabric laminate according to claim 1, wherein the nonwoven fabric laminate has residual strain of less than 50% when the nonwoven fabric laminate is stretched 100%.

* * * * *